United States Patent Office 3,029,580
Patented Apr. 17, 1962

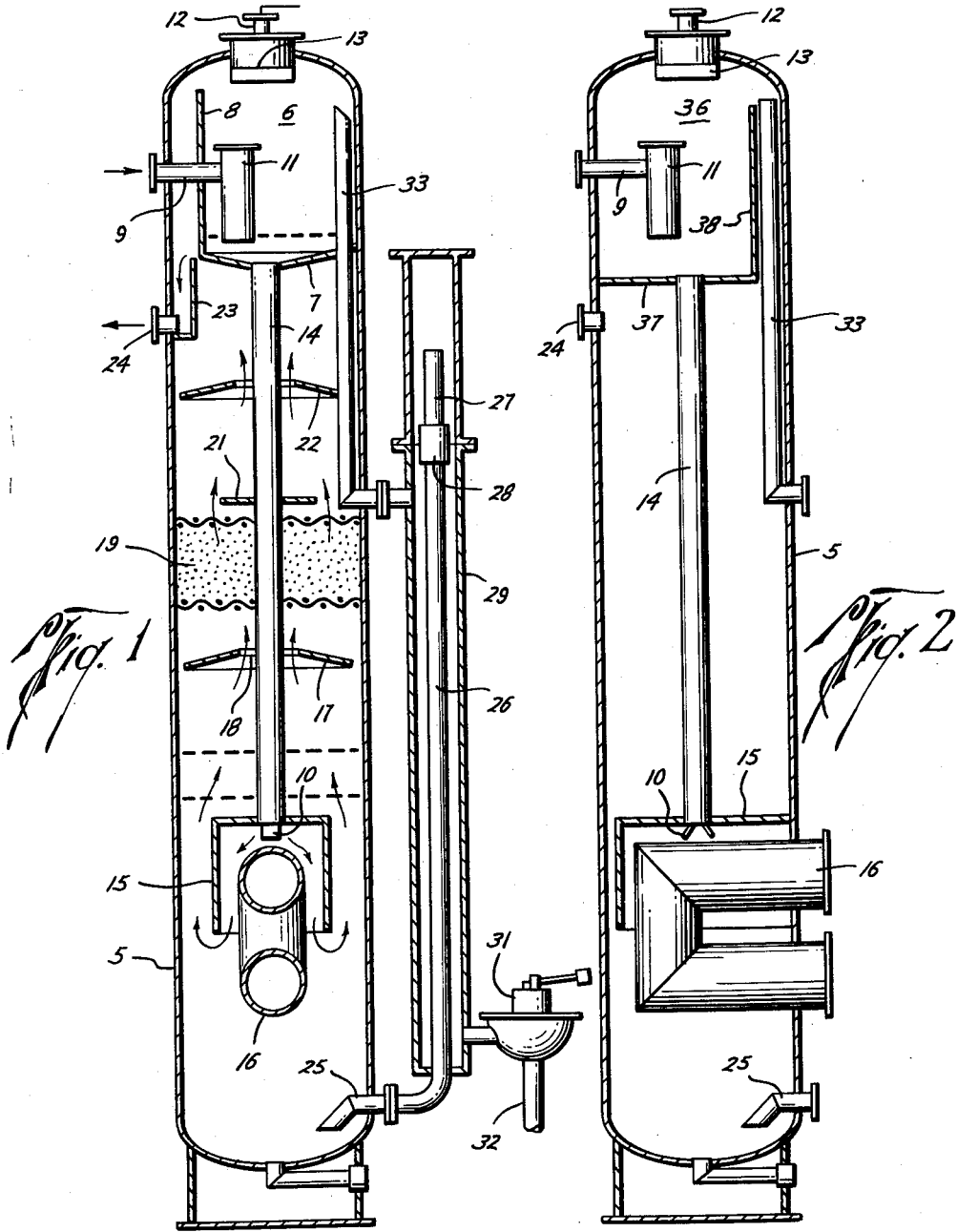

---

3,029,580
EMULSION TREATING
Charles R. Perry, Odessa, Tex., assignor to Sivalls Tanks, Inc., Odessa, Tex.
Filed Sept. 29, 1959, Ser. No. 843,198
7 Claims. (Cl. 55—164)

This invention relates to improvements in apparatus and processes for the treatment of emulsions of oil and water. It is particularly valuable when applied to the treatments of emulsions of crude oil and water containing petroleum gas and substantially no "free" water.

Many oil and gas wells produce well fluids in the form of petroleum gas-crude oil-water emulsions. These emulsions are of the type generally called "loose" or "tight" in the oil producing business. The term "loose" is applied to emulsions of such type that a layer of water is easily separated from the emulsion by slight agitation and settling. The term "free" water is used to designate the water which spontaneously separates from the emulsions. This invention is especially valuable when applied to tight emulsions containing substantially no "free" water.

It is common practice to break emulsions of crude oil and water containing natural gas by first passing the emulsion into a gas removal zone, separating as much gas as is possible in this zone and then heating to break the emulsion. Complicated and expensive arrangements frequently are used to carry out the general steps.

Complicated equipment frequently presents a great many points for the beginning of corrosive attack such as welds and other joints, and corrosion at such places frequently is intensified by a thermoelectric effect accompanying heating the emulsion. Emulsified well fluids frequently are extremely corrosive due to the presence of salt water or an acidic gas such as hydrogen sulfide. As the emulsion breaks, most of the corrosive materials remain in a separated water phase where they frequently cause failure of apparatus at points where a hot separated water phase comes in contact with iron or mild steel. Efficient heating of such emulsions also has presented numerous problems, because the water phase usually contains a high proportion of scale forming materials and these deposit on fireboxes or other heating equipment where they interfere with heat transfer.

Heating emulsions of this general nature also frequently is accompanied by loss of the lighter hydrocarbons by vaporization from hot oil as it separates from the emulsion thus decreasing the gravity and value of the oil.

It is an object of this invention to provide an apparatus and process having high efficiency for breaking tight emulsions containing very little free water. Another object is to provide such apparatus and process which results in very thorough separation of tight emulsions into oil and water phases with minimum loss of light hydrocarbons from the oil. Another object is to provide an apparatus and process in which vaporized light hydrocarbons are recovered by scrubbing with incoming cold emulsion. Another object is to provide a process and apparatus for protecting hot emulsion and oil separated therefrom against excessive loss of heat to the atmosphere, and to expose water separated from the emulsion to cooling by radiation of heat to the atmosphere.

Another object is to provide such apparatus and process in which high heat efficiency is obtained, scale formation is reduced and corrosion is minimized. Still another object is to provide apparatus which is simple and cheap in construction and is so built that it is easy to apply corrosion resistant coatings to parts exposed to corrosive water.

Other objects, advantages and features of this invention will be apparent to one skilled in the art upon a consideration of the written specification, the attached claims and the annexed drawings.

The apparatus of the present invention is a very simple one. It comprises an upright tower having a gas removal chamber in its upper end. An inlet for emulsified well fluid communicates with this chamber, a means for making a preliminary separation of gas and emulsion is located therein and a suitable outlet for separated gas is provided. An emulsion conductor pipe is substantially centrally arranged within the tower and passes through a plate forming the floor of the gas removal chamber. When well fluid builds up in the gas removal chamber to an extent sufficient to overcome hydraulic head in a manner later explained in detail, it flows through this emulsion conductor pipe down to a heating zone in the lower part of the tower. A firebox, preferably of U shape, is disposed in the lower part of the tower and is enclosed by a hood around at least an upper major part of the firebox. The emulsion conductor pipe communicates with the interior of the hood, and thus co-operates with the hood to provide a means for passing emulsion downward through the tower and within the hood in contact with the firebox, and for scrubbing light hydrocarbons, evaporated by contact with the firebox, with cold entering emulsion.

Downward flow is important in reducing scale formation since the emulsions flowing down over the firebox have a tendency to sweep deposits off the firebox before they become solidified in place. The hood also provides a means for rapidly heating emulsion by direct contact with the firebox by limiting the amount of emulsion that can be in such contact at any given time. Suitable means such as vanes are provided at the lower end of the emulsion conductor tube to spread the flow of emulsion evenly along the entire length of the hood and firebox to obtain maximum heating efficiency. High heating efficiency is thus obtained.

The hood does not enclose the firebox completely but a lower part of the firebox is in contact with water which separates from the emulsion and keeps this water at high temperature. Preferably, the water-oil interface within the tower is maintained at a point well above the top of the hood in a manner to be described later, and thus the hood is at all times surrounded by a layer of hot water. Since hot emulsion emerging from underneath the hood is lighter than water, it flows upward and is subjected to a hot water scrub as it passes through the water layer.

The emulsion breaks and separates into oil and water. Unbroken emulsion and oil separating therefrom pass upward through a settling zone above the water-oil interface because of lower density. Preferably, a conical baffle having a large central opening and of such size as to reach near the walls of the tower, is placed at a point somewhat above the oil-water interface. As hot emulsion and oil rise against this conical baffle, they are deflected to a central part of the tower and pass up through the central opening of the baffle. Water separating from the emulsion in this zone falls down upon the upper face of the conical baffle and is deflected outward against the walls of the tower. Passing the water peripherally along the walls of the tower conserves heat in the centrally located emulsion and oil, as the heat lost through the walls of the tower to the atmosphere comes principally from separated water.

The walls of the tower preferably are not insulated but are exposed to the atmosphere and there is therefore considerable radiation of heat from them. This radiation of heat cools water flowing along the walls of the tower and increases the specific gravity of the water and the speed of its separation by downward flow.

Above the first conical baffle a filter section may be installed, if desired, although the filter is not required by most emulsions, even those of very tight nature. When used, the filter section should be placed where it will be in the oil phase since clogging and caking with lime deposits is minimized in this position. When the filter section is used, a small central flat baffle preferably is installed around the emulsion conductor pipe in order to deflect oil and any emulsion containing therein flowing upward through the central portion of the tower somewhat outward. The purpose of this flat baffle is to prevent channelling. A second conical baffle is placed in the upper part of the tower to again direct rising fluid toward the center of the tower, and to direct downcoming fluid, principally water, along the periphery of the tower where it comes in contact with the cooler walls of the tower.

An oil outlet is disposed in the upper part of the tower and preferably comprises a weir of sufficient height to hold the top of the separated oil against the cold bottom of the gas separating chamber.

This construction has two great advantages. First, it decreases the area from which light ends might evaporate from the hot separated oil and second, it prevents evaporation of certain light ends which are substantially at their evaporation temperature as the clean oil comes in contact with the bottom of this cold plate. The combination of reduced area exposed to evaporation and cooling of the surface, act in combination with the scrubbing action of cold emulsion flowing down through the emulsion conductor pipe upon more volatile hydrocarbons evaporated from the emulsion by contact with the firebox, to prevent gravity loss with its corresponding decrease in the price per barrel of the oil recovered.

The water-oil interface above the hood in the lower part of the tower is controlled by a water siphon pressure equalizer apparatus. This apparatus is connected to a water outlet from a lower part of the tower and to the interior of the gas separation chamber. The water outlet communicates with a vertical line contained within a jacket and water from the bottom of the tower overflows from the top of this water line continually into the outer jacket. The height of the vertical water line, which preferably is adjustable, determines the hydraulic head within the tower, and consequently determines the location of the water-oil interface in the tower. A line connects the interior of the jacket with an upper part of the gas removal chamber, thus equalizing gas pressure in the jacket and chamber. The rate of its withdrawal from the outer jacket is regulated by a valve contained in an outlet line from this jacket.

It will be seen that the apparatus of this invention is a very simple one comprising in combination an upright tower, a gas separating chamber, a firebox disposed in the lower end of the pipe and a hood covering at least a major upper part of the firebox, means for flowing the emulsion down in contact with the firebox within the hood, means for scrubbing the emulsion with hot water, suitable baffles, a filter section, if desired, and an inlet and outlets for fluids. All the parts which are exposed to water separated from such emulsions have substantially uninterrupted smooth surfaces easily protected by coal tar-epoxy or other suitable type of corrosion preventing coating and there is no complicated arrangement of parts which are subjected to contact with corrosive water.

A part of the firebox must be exposed to water. A U-shaped firebox may be made of two parts if desired so that a lower part, subject to more severe corrosion from contact with the hot water layer, may be removed and replaced easily and cheaply when it is necessary to do so.

An apparatus of this type operated as described has proved highly efficient in breaking the tightest emulsions. With moderately tight emulsions, containing substantially no free water, a modification of this design is preferred. This modification merely provides for omitting the baffles and filter section from the apparatus described above. This arrangement still further simplifies the construction and is quite efficient for moderately tight emulsions.

The process of this invention, which also can be carried out in other types of apparatus, comprises passing an emulsion downward through a heating zone, heating the emulsion and oil separating therefrom upward through a hot water scrubbing zone into a settling zone and therein separating the emulsion into oil and water phases. The hot emulsion and oil is passed upward centrally through the settling zone and water separating from the emulsion is passed downward along the outer periphery of this zone. Heat is conserved in the emulsion and loss of heat occurs principally in the water separated from the emulsion thus increasing the difference in density between the emulsion and water and increasing the downward rate of flow of the water.

In the drawings, wherein like reference characters are used throughout to designate like parts:

FIG. 1 is a vertical section through a preferred apparatus of the present invention.

FIG. 2 is a vertical section taken at right angles to section 1 through a modified device in which baffles and filter are omitted.

In FIG. 1 the reference numeral 5 indicates a vertical tower. Preferably this tower is constructed of mild steel plate. It must have sufficient strength to withstand operating pressures which are ordinarily of the order of 25 pounds per square inch. A gas separating chamber, designated generally by the numeral 6, is disposed in the upper part of the tower. Chamber 6 is defined by a bottom plate 7 and a wall 8 at the upper end of the tower. Chamber 6 thus fills the entire upper end of the tower except for a small area determined by wall 8 and the corresponding arc of the tower wall. Wall 8 does not extend to the top of the tower but ends at some distance from the top, thus leaving a passage for gases to flow upward outside of wall 8 into chamber 6.

An inlet for an emulsified well fluid is disposed in the upper part of the tower and extends into chamber 6. Inlet pipe 9 has a flattened end disposed to inject a jet of emulsified well fluid into a vertical centrifugal separating ring 11, tangentially upon the inner surface of the ring. As a result of this arrangement, the jet of well fluid flows down centrifugal separating ring 11 in a spiral path and flows out of ring 11 at its bottom. In flowing downward through ring 11 the emulsion is spread out in a very thin layer and subjected to centrifugal force, freeing the emulsion from easily removable petroleum gas. The gas separated from the emulsion flows out of the upper end of the centrifugal separating ring 11 into chamber 6 from which it is withdrawn through a suitable mist extractor 13, preferably packed with ceramic saddles or similar material, and gas outlet line 12.

Emulsion separated from gas flows out of the bottom end of centrifugal separating ring 11 and forms a layer upon bottom plate 7. The thickness of the layer of emulsion upon this plate is determined by hydraulic head controlled by a vertical water line in a manner described later. The thickness of this layer is such that the bottom end of centrifugal separating ring 11 dips into the layer of emulsion upon plate 7 and thus prevents excessive agitation of material upon the plate, thereby permitting escape of any gas held in the emulsion. Plate 7 preferably is slightly conical in shape and has a substantially central opening therethrough communicating with emulsion conductor pipe 14.

Pipe 14 communicates at its lower end with a firebox hood 15 having an open bottom and disposed to enclose at least an upper major portion of a firebox 16 located in the lower part of the tower. Preferably emulsion conductor pipe 14 is equipped with vanes 10 which act to spread incoming emulsion evenly over the entire length of the firebox.

Firebox hood 15 may have a flat top and vertical walls as illustrated or may be suitably curved to fit more closely around the firebox to provide increased velocity and sweeping action of emulsion flowing downward in contact with the firebox if increased sweeping action is desired. This modification may be desirable occasionally for some particularly troublesome scale forming emulsions, but ordinarily it is not required. Emulsion conductor pipe 14 and hood cooperate to form means for passing the emulsion downward within the hood in contact with the firebox.

Firebox 16 preferably is made in the conventional U-shape and at least a portion, preferably about one-half, of the firebox is located below the level of the bottom of hood 15 where it will be in contact with and heat a layer of water separated from the emulsion.

The hood 15 also serves as a means for maintaining a water emulsion interface within the hood and substantially at its lower edge. This arrangement results in a major upper part of the firebox being in contact with emulsion at all times and a lower part being in contact with separated water.

A conical baffle, having a large central opening 18 and of such size as to leave a small space between its outer edge and the wall of the tower, is disposed above the firebox and above the oil-water interface, as is explained later in describing its operation.

Above baffle 17 a filter section 19 is installed if desired. Use of a filter section, ordinarily filled with "excelsior" or other similar material, may be indicated with some emulsions, but this section usually is not necessary. When a filter section 19 is used, a small flat baffle 21 is installed just above the filter section to deflect flow of liquid outward to a sufficient degree to avoid channelling. A second conical baffle is installed in the upper part of the tower. Baffle 22 also has a large central opening and extends outward almost to the wall of the tower.

A weir 23 of such height as to maintain contact of liquid in the tower with the bottom of plate 7 is installed in the upper part of the tower and an outlet for oil communicates with space between the wall of the tower and weir 23. The space between the wall of the tower, weir 23, and wall 8 provides a passage for gas evolved at weir 23 to the gas removal chamber 6.

A water outlet line 25 communicates with the lower part of the tower and conducts water to a vertical line 26 which is connected to a nipple 27 by union 28. Nipple 27 and union 28 provide a means for adjusting the height of line 26 and provide for balancing static head within tower 5 by suitable adjustment of nipple 27 and union 28. The thickness of the layer of emulsion lying on the bottom of the gas removal chamber 6 is determined by hydraulic balance and the height of the emulsion water interface in tower 5 also is determined. Water overflows continually from the top of nipple 27 and flows into an outer jacket 29 from whence it is withdrawn by control valve 31 and outlet line 32. The upper part of jacket 29 communicates with the interior of gas separation chamber 6 by line 33, thus equalizing pressure in jacket 24 with that in chamber 6.

FIG. 2 shows a modification of the apparatus of the present invention which is recommended when there is substantially no free water in an emulsion to be treated and the emulsion is only moderately tight. This modification is substantially similar to that just described under FIG. 1 with the exception that the baffles and filter section are omitted.

In FIG. 2 the reference numeral 5 indicates an upright tower having a gas removal chamber 36 in its upper end. Chamber 6 is defined by a wall 38 and the upper end of the tower. An inlet line for well fluids and a centrifugal separating ring 11 identical with those described under FIG. 1 above are disposed in chamber 36. The bottom of chamber 36 is closed by a somewhat conical plate 37 having a central opening adapted to receive an end of emulsion conductor pipe 14 therein. The emulsion conductor pipe extends downward centrally to a firebox hood 15 and communicates therein. A firebox 16 is disposed in the lower part of the tower and is so positioned that an upper major part of it is surrounded by hood 15. Vanes 10 are provided at the lower end of emulsion conductor pipe 14 and are arranged to spread entering cold emulsion substantially uniformly over the entire length of the firebox. A water outlet 25 communicates with vertical tube 26, nipple and union 27 and 28, respectively, and jacket 29 as described under FIG. 1 are provided, but are not shown in FIG. 2. Jacket 29 communicates with the interior of gas separation chamber 36 via line 33 installed in a space between wall 38 and the wall of the tower. This space also serves as passage for any gas liberated for hot-oil into gas chamber 36. An outlet 24 for clean oil is provided in an upper part of the tower near plate 37 forming the bottom of gas removal chamber 36.

It will be seen that the oil-water interface in tower 5 is controlled by the height of the top of nipple 37 as was described under FIG. 1. The emulsion conductor pipe 14 and hood 15 serve as a means for passing cold emulsion down through the tower and through the hood in contact with the firebox thus providing rapid heating and a downward flow which sweeps deposits off the firebox before they have time to set up into a hard scale. Emulsion coming out from under the edges of hood 15 is immediately subjected to a hot-water scrub and is breaking at that time. The emulsion passes upward and all of the upper part of tower 5 above the oil-water interface serves as a settling chamber from which water separates downward and clean oil is withdrawn via line 39.

I have found that this construction is a highly efficient one for emulsions which are only moderately tight and which contain substantially no free water. The rapid heating followed immediately by hot water scrub ordinarily is sufficient to take care of emulsions of this type and separate them completely into water and oil phases. The conical baffles described under FIG. 1 are recommended for tight emulsions. This apparatus and process has been used extensively, both experimentally and on full commercial scale for several months. We find that they are highly efficient in separating those emulsions which contain very little free water. The device of FIG. 1 has been used in separating the tightest emulsions and has handled these with great efficiency. The device of FIG. 2 has been found to be very efficient when the mulsion is only moderately tight. One or the other of the modifications illustrated thus are effective with any emulsion which contains substantially no free water.

From the foregoing it will be seen that this invention is one well adapted to attain all of the ends and objects hereinabove set forth, together with other advantages which are obvious and which are inherent to the process and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An emulsion treating apparatus comprising in combination a vertical tower; a gas separation chamber disposed in an upper end of the tower; an inlet for emulsion disposed in said gas separating chamber; a gas outlet communicating with said gas separation chamber; a firebox disposed in a lower part of the tower; a hood having an open bottom disposed to enclose a restricted space within the tower around a major upper part of the firebox; a centrally disposed emulsion conductor pipe communicating with the bottom of said gas separation chamber and with an upper part of said hood, cooperative with said hood to pass emulsion downward through the hood in direct contact with the firebox; means for maintaining an oil-water interface in the tower at a level above the hood; a settling zone in the tower above the interface; means for withdrawing separated oil from an upper part of the tower; and means for withdrawing separated water from a lower part of the tower.

2. An emulsion treating apparatus comprising in combination a vertical tower; a firebox disposed in a lower part of the tower; a hood having an open bottom disposed to enclose a restricted space within the tower around a major part of the firebox; means for introducing an oil-water emulsion into the gas separating chamber; a substantially vertical central pipe communicating with the bottom of said gas chamber in the top of said hood, cooperative with the hood to pass emulsion downward within the hood in direct contact with the firebox and upward along the outside of said hood; means for maintaining an oil-water interface at a level at the top of said hood; a conical baffle substantially horizontally disposed within said tower, said baffle having a large central opening and being of such size as to extend near to the walls of said tower; a filter section disposed in said tower above said conical baffle; a small, flat, substantially horizontal baffle centrally disposed in the tower above said filter section; a second conical baffle substantially horizontally disposed within said tower above said flat baffle; said conical baffle having a large central opening therethrough and being of such size as to extend near the walls of the tower; means for withdrawing separated oil from an upper part of the tower; and means for withdrawing separated water from a lower part of the tower.

3. An emulsion treating apparatus comprising in combination a vertical tower; a gas separating chamber disposed in an upper part of the tower; a firebox disposed in a lower part of the tower; a hood having an open bottom disposed to enclose a restricted space within the tower around a major upper part of the firebox; means for introducing an oil-water emulsion containing petroleum gas into the gas separation chamber; means comprising a substantially vertical pipe communicating with the bottom of said gas separation chamber and with the hood, cooperative with the hood to pass emulsion downward from the gas separation chamber into direct contact with the firebox and upward along the outside of said hood; means for maintaining an oil-water interface at a level above the top of said hood; a conical baffle having a large central opening therethrough and of such size as to extend near to the walls of said tower substantially horizontally disposed within the tower at a level above said oil-water interface; means for withdrawing separated clean oil from an upper part of the tower; and means for withdrawing separated water from a lower part of the tower.

4. An emulsion treating apparatus comprising in combination a vertical tower; a gas separating chamber disposed in an upper part of the tower; a firebox disposed in a lower part of the tower; a hood having an open bottom disposed to enclose a restricted space within the tower around a major upper part of the firebox; a substantially vertical central pipe communicating with the bottom of said gas removal chamber and with the top of said hood, cooperative with the hood to pass emulsion down within the hood in direct contact with the firebox and upward along the outside of said hood; means for maintaining an oil-water interface at a level above the top of said hood; a plurality of conical baffles vertically spaced from each other disposed substantially horizontally within the tower, each of said baffles having a large central opening therethrough and being of such size as to extend near to the walls of said tower; means for withdrawing separated clean oil from an upper part of the tower; and means for withdrawing separated water from a lower part of the tower.

5. An emulsion-treating apparatus comprising in combination a vertical tower; a firebox disposed in a lower part of the tower; a vertically disposed emulsion conductor conduit which is free of any heating elements, said conductor conduit being arranged in the tower with an upper opening to receive a major portion of an emulsion entering the apparatus and also having a lower opening, a closed top and open bottom enclosure means surrounding a major upper part of the firebox to provide a laterally restricted space therearound and connected at its top through an opening to the lower opening in said conductor conduit above the firebox so that emulsion from said lower opening of said conductor conduit is caused to flow downward in the enclosure means over and in direct contact with the firebox to be discharged from the open bottom of the enclosure means while any gas released in said enclosure means is free to flow upwardly therefrom into said conductor conduit for contact with downcoming emulsion; means for withdrawing separated water from a lower part of the tower and for maintaining a water level in the tower above the point at which the emulsion is discharged from the enclosure means so that the emulsion is scrubbed with hot water immediately after being discharged from the enclosure means; a settling zone in the tower above the firebox; and means for withdrawing separated oil from an upper part of the tower.

6. An emulsion-treating apparatus comprising in combination a vertical tower; a firebox disposed in a lower part of the tower; a hood having a closed top and open bottom arranged to enclose a laterally restricted space within the tower around the major upper part of the firebox; means for introducing an oil-water emulsion into the tower; conduit means having an opening in its upper end to receive emulsion introduced into the tower and having a lower open end connected to the hood through an opening in the top of the hood and terminating in the hood above the firebox for passing the emulsion downward into the top of the hood for downward flow through the hood in direct contact with the firebox and for conducting any gas released adjacent the firebox upwardly in countercurrent contact with downcoming emulsion in the conduit means, said conduit means being free of any heating elements; means for maintaining an oil-water interface in the tower at a level above the hood; a settling zone in the tower above the interface; means for withdrawing separated oil from an upper part of the tower; and means for withdrawing separated water from a lower part of the tower.

7. An emulsion-treating apparatus comprising in combination a vertical tower; a firebox disposed in a lower part of the tower; a hood having a closed top and open bottom arranged to enclose a laterally restricted space within the tower around a major upper part of the firebox; means, including said hood and a substantially vertical conduit connected to and terminating in the hood above the firebox, for passing an oil-water emulsion downward through the hood in direct contact with the firebox and upward along the outside of said hood in contact with hot water and for passing any gas released in the hood upwardly in said conduit in countercurrent contact with downcoming emulsion therein, said conduit being free of any heating elements; means for maintaining an oil-water interface within said tower at a level above the top of said hood; means for withdrawing separated oil from an upper part of the tower; and means for withdrawing separated water from a lower part of the tower.

References Cited in the file of this patent

UNITED STATES PATENTS

| | | |
|---|---|---|
| 1,628,574 | Brady | May 10, 1927 |
| 1,710,178 | McMurray | Apr. 23, 1929 |
| 2,354,856 | Erwin | Aug. 1, 1944 |
| 2,598,988 | Glasgow | June 3, 1952 |
| 2,610,698 | Lovelady et al. | Sept. 16, 1952 |
| 2,706,015 | Bills | Apr. 12, 1955 |
| 2,832,431 | Lovelady et al. | Apr. 29, 1958 |